US005804309A

United States Patent [19]

Itoh et al.

[11] Patent Number: 5,804,309

[45] Date of Patent: Sep. 8, 1998

[54] CHARGING ROLL

[75] Inventors: Tetsuya Itoh, Komaki; Takafumi Yamamoto, Nagaizumi-cho; Hiroki Sugiura, Komaki; Atsuhiro Kawano, Kasugai; Wataru Imamura, Komaki; Saburou Hayashi, Kasugai, all of Japan

[73] Assignee: Tokai Rubber Industries, Ltd., Japan

[21] Appl. No.: 820,282

[22] Filed: Mar. 18, 1997

[30] Foreign Application Priority Data

Mar. 19, 1996 [JP] Japan .................................... 8-062609

[51] Int. Cl.[6] ................................ D02G 3/00; B25F 5/02; F16C 13/00

[52] U.S. Cl. .......................... 428/375; 428/379; 428/383; 428/906; 492/56; 492/49

[58] Field of Search ............................. 427/212; 428/195, 428/204, 411.1, 913, 914, 375, 392, 379, 383, 906; 492/49, 56

[56] References Cited

FOREIGN PATENT DOCUMENTS 62-205387 9/1987 Japan .
63-149668 6/1988 Japan .
2-311865 12/1990 Japan .
2-311868 12/1990 Japan .

*Primary Examiner*—Newton Edwards
*Assistant Examiner*—J. M. Gray
*Attorney, Agent, or Firm*—Parkhurst & Wendel, L.L.P

[57] ABSTRACT

A charging roll which is held in contact with an outer circumferential surface of an image bearing medium for charging the surface of the image bearing medium by application of a DC voltage and an AC voltage which is superimposed on the DC voltage, the charging roll comprising: a center shaft; an electrically conductive base layer formed on an outer circumferential surface of the shaft; an outer structure formed on an outer circumferential surface of the conductive base layer; and the charging roll having Asker C hardness of less than 48 degrees as measured upon application of 1 kg load thereto and micro rubber hardness in a range of 65–85 degrees as measured upon application of 33.85 g load thereto.

23 Claims, 2 Drawing Sheets

CHARGING ROLL

BACKGROUND OF THE INVENTION

1. Field of the Invention

The present invention relates in general to a charging roll for use in an image forming apparatus such as an electrophotographic copying machine, printer, facsimile or the like. In particular, the invention is concerned with such a charging roll for charging an image bearing medium such as a photoconductive or photosensitive medium used in electrophotography, and a dielectric medium used in electrostatic recording.

2. Discussion of the Related Art

In a conventional image forming apparatus such as an electrophotographic copying machine, printer, facsimile or the like, a corona charging method has been employed, wherein a corona discharge device is used for charging a surface of an image bearing medium such as a photoconductive or photosensitive body or drum. However, the corona charging method gives rise to some problems, such as (1) the necessity of high-voltage power supply, (2) the occurrence of a high level of ozone, and (3) the necessity of an expensive power supply device. In recent years, therefore, there has been employed a so-called roll charging method in which an image bearing medium is held in contact with an outer circumferential surface of a charging roll, so that the surface of the image bearing medium is charged by the charging roll.

The charging roll which is held in contact with the image bearing medium for charging its surface is generally required to satisfy the following requirements: (1) The charging roll is held in good contact with the image bearing medium; (2) The image bearing medium is not contaminated by a softener which comes out onto the outer surface of the roll; (3) The electric resistance of the charging roll is suitably controlled; and (4) The charging roll has a low degree of tackiness. To satisfy these requirements, there is known a charging roll as proposed in JP-A-2-311868. This charging roll includes a center shaft (metal core) and an electrically conductive base layer which is formed on an outer circumferential surface of the center shaft so as to have a suitable thickness and which is made of a non-foamable, electrically conductive rubber material. On the outer circumferential surface of the conductive base layer, there are formed, a softener-preventing layer formed of an electrically conductive resin material, a resistance adjusting layer formed of a semi-conductive rubber material, and a protective layer formed of a semi-conductive resin material, in the order of description in the radially outward direction of the roll.

As one example of a method of charging the outer surface of an image bearing medium by using the charging roll constructed as described above, JP-A-63-149668 discloses a voltage application charging method wherein a a DC (direct current) voltage and an AC (alternating current) voltage which is superimposed on the DC voltage are applied to the charging roll. Described more specifically by reference to FIG. 4, the surface of a charging roll 32 is held in contact with that of an image bearing medium in the form of a photosensitive or photoconductive drum 34. In this condition, the drum 34 is rotated while a DC voltage generated by a DC power source 33 and an AC voltage (a sine wave) generated by an AC power source 35 are applied to the charging roll 32, such that the AC voltage is superimposed on the DC voltage, whereby electric charges are given to the entire surface of the drum 34.

In the charging method as described above, the surface of the drum 34 is charged with stability since the voltage applied to the charging roll 32 consists of the DC voltage and the AC voltage superimposed on the DC voltage. On the other hand, the charging method suffers from a problem described below which arises from a recently increasing demand for a high performance of a copying machine, a printer or the like.

As is well known, when the DC voltage and the AC voltage which is superimposed on the DC voltage are applied to the charging roll 32, there is generated a force which attracts the charging roll 32 and the drum 34 toward and away each other due to the AC electric field, depending upon changes in the polarity of the AC voltage (the frequency of the AC voltage). In this condition, the drum 34 inevitably vibrates, and the frequency of the vibration of the drum 34 increases with an increase in the frequency of the AC voltage to be applied. When the frequency of the applied AC voltage is in not more than 200 Hz, a major component of the vibration frequency of the drum 34 is about 400 Hz which is outside an audible range. In this case, the vibration of the drum 34 does not cause a serious problem during the operation of the imaging forming apparatus such as a copying machine, a printer or the like. When the frequency of the AC voltage exceeds 200 Hz, the vibration frequency of the drum 34 falls in the audible range. With a further increase in the frequency of the AC voltage, the drum 34 undesirably vibrates to such an extent to cause a noise having a sound pressure level higher than a permissible level of about 55 dB. The permissible sound pressure level of the noise generated by business machine is generally lower than about 55 dB. To meet an increasing demand for a high image quality by improving image resolution and for a higher process speed of the image forming apparatus, the AC voltage having a frequency as high as about 2000 Hz is applied to the charging roll in a high-speed copying machine or printer which performs its copying or printing operation at a high speed. In this case, the drum 34 vibrates to a considerable extent, thereby undesirably causing a loud noise.

Conventionally, various attempts have been made in order to prevent the noise which is generated when the drum surface 34 is charged by the charging roll 32, i.e., so-called “charging noise”. For example, the hardness of the charging roll 32 is lowered. Alternatively, the drum 34 has a a cylindrical hole, and an aluminum member having the substantially same diameter as the cylindrical hole of the drum 34, so that the drum 34 is made solid.

If the hardness of the charging roll 32 is lowered, the occurrence of the charging noise is prevented to a certain extent when the AC voltage with a relatively low frequency is applied to the charging roll. On the contrary, when the AC voltage with a relatively high frequency is applied to the charging roll whose hardness is lowered, the effect of preventing the occurrence of the charging noise is considerably reduced. Thus, the charging roll having lowered hardness suffers from variation in the effect of preventing the occurrence of the charging noise, depending on the magnitude of the frequency of the applied AC voltage.

If the aluminum member is disposed in the inner hole of the cylindrical drum 34 as described above, the occurrence of the charging noise is prevented more effectively as compared when the hardness of the charging roll is lowered. However, the aluminum member disposed in the inner hole of the drum 34 undesirably deforms the drum 34 which is required to have a high degree of dimensional accuracy, resulting in considerably deteriorated image producing capability, e.g., lowered copying and printing quality, of the image forming apparatus in which the charging roll is incorporated.

SUMMARY OF THE INVENTION

It is therefore an object of the present invention to provide a charging roll which has reduced charging noise, irrespective of a frequency of an AC voltage applied thereto, without deteriorating image producing capability of an image forming apparatus in which the charging roll is incorporated.

To attain the above object, the inventors of the present invention conducted an experiment to examine the influence of the hardness of the charging roll on the charging noise. A plurality of charging rolls having different hardness values were installed on respective image producing apparatus. For charging the surface of the photosensitive drum incorporated in each image forming apparatus, a DC voltage and an AC voltage which was superimposed on the DC voltage were applied to each of the charging rolls at different frequency values of the AC voltage. The sound pressure level of the charging noise generated upon charging of the drum surface was measured at each frequency value of the applied AC voltage. The results of the experiment are as follows. Namely, the sound pressure level of the charging noise was 55 dB or lower when the AC voltage having the frequency of 200–400 Hz was applied to the charging roll whose Asker C hardness (which will be described in detail) was about 42 degrees (i.e., low-hardness charging roll), whereas the sound pressure level was 60 dB or higher when the frequency of the applied AC voltage was higher than about 1000 Hz. On the other hand, in a charging roll having the Asker C hardness of about 55 degrees (i.e., high-hardness charging roll), the sound pressure level of the charging noise generated upon application of the AC voltage having the frequency of about 200 Hz differed from that of the charging noise generated upon application of the AC voltage having the frequency of about 2000 Hz, by an amount as small as about 5 dB. According to the results of the experiment, it was confirmed that the sound pressure level of the charging noise was as low as the permissible level when the frequency of the AC voltage applied to the low-hardness charging roll was relatively low, whereas the sound pressure level of the charging noise was over the permissible level when the frequency of the applied AC voltage was relatively high. In the high-hardness charging roll, it was revealed that the dependence of the sound pressure level of the charging noise on the frequency of the applied AC voltage was low.

In view of the above, the inventors of the present invention made a research to provide the low-hardness charging roll in which the dependence of the charging noise on the frequency of the AC voltage is low, for the purpose of reducing a rate of increase in the sound pressure level which increases with an increase in the frequency of the AC voltage while, at the same time, lowering the sound pressure level of the charging noise generated upon application of the AC voltage in the low frequency range. According to this arrangement, the sound pressure level of the charging noise can be made low over a wide frequency range of the AC voltage applied to the charging roll. In the meantime, the inventors have noticed that the area of contact between the roll and the drum is inevitably small when the high-hardness charging roll is held in contact with the drum. If the contacting force or load of the roll with respect to the drum is reduced, the contact area between the roll and the drum can be made small with ease. In this case, however, the charging roll tends to be oscillatingly moved in opposite directions toward and away from the surface of the image bearing medium when the process speed (such as copying or printing speed) of the image forming apparatus is considerably high, resulting in poor image quality caused by reduced charging uniformity due to the oscillatory movement of the roll. By taking account of this fact, the inventors made a further research to provide a charging roll which effectively prevents or reduces the occurrence of the charging noise.

The extensive research made by the inventors provided a charging roll comprising a shaft, an electrically conductive base layer formed around the shaft, and an outer structure formed on the outer circumferential surface of the conductive base layer, wherein the hardness of the conductive base layer is made low for the purpose of lowering the overall hardness of the roll while the hardness of the surface layer is made higher than that of the conductive base layer for the purpose of raising the hardness of the roll surface. The charging roll according to this arrangement assures: reduction in the sound pressure level of the charging noise over a wide frequency range of the applied AC voltage; reduced dependence of the sound pressure level of the charging noise on the frequency of the AC voltage; reduced contact area between the image bearing medium and the roll while assuring a sufficiently large contact force of the roll with respect to the image bearing medium; freedom from the oscillatory movement of the roll even at a comparatively high process speed of the image forming apparatus; and freedom from poor image quality due to reduced charging uniformity.

The present invention was developed based on the above finding, and the above-indicated object of the invention can be attained according to a principle of the invention which provides a charging roll which is held in contact with an outer circumferential surface of an image bearing medium for charging the surface of the image bearing medium by application of a DC voltage and an AC voltage which is superimposed on the DC voltage, the charging roll comprising: a center shaft; an electrically conductive base layer formed on an outer circumferential surface of the shaft; an outer structure formed on an outer circumferential surface of the conductive base layer; and the charging roll having Asker C hardness of less than 48 degrees as measured upon application of 1 kg load thereto and micro rubber hardness in a range of 65–85 degrees as measured upon application of 33.85 g load thereto.

In the charging roll produced according to the present invention, the Asker C hardness representative of the overall hardness of the roll is adjusted to not more than 48 degrees as measured upon application of 1 kg load to the roll, so that the charging roll has a low overall hardness. At the same time, the micro rubber hardness representative of the surface hardness of the roll is adjusted to a relatively high value, i.e., in a range of 65–85 degrees as measured upon application of 33.85 g load to the roll, so that the the hardness of the roll surface is suitably increased.

The charging roll according to the present invention has significantly reduced charging noise, irrespective of the frequency of the AC voltage applied thereto, without deteriorating image producing capability of the image forming apparatus in which the charging roll is incorporated.

The Asker C hardness upon application of 1 kg load to the charging roll is measured by using a spring-type hardness tester according to JIS-S-6050 (Japanese Industrial Standard) ("rubber.plastic hardness tester Asker C-type available from KOBUNSHI KEIKI CO., LTD., Japan). The tester has a spring and a semi-spherical measuring head having a diameter of 5.08±0.02 mm. The measuring head protrudes by a distance of 2.54 mm from a lower surface of the tester. The tester has 100 graduations. The load acting on the spring when the pointer of the tester is at zeroth graduation is 55 gf while the spring load when the pointer is at 100th graduation is 855 gf±8 gf. In measuring the Asker C hardness of the charging roll, the charging roll is supported by V-blocks at its axially opposite ends such that the roll extends in the horizontal direction. The semi-spherical measuring head is brought into a pressed contact with the circumferential surface of the charging roll at its axially middle portion. In this state, only the weight of the tester acts on the roll through the measuring head. Then a force is applied to the tester in the vertical direction, so that a total of 1 kg load acts on the roll. The reading of the tester represents the Asker C hardness upon application of the force.

The micro rubber hardness upon application of 33.85 g load to the charging roll is measured by using a spring-type hardness tester ("micro rubber hardness tester.MD-1" available from KOBUNSHI KEIKI CO., LTD., Japan) using a cantilever plate spring. This tester has a cylindrical measuring head having a diameter of 0.16 mm. The measuring head protrudes by a distance of 0.5 mm from a lower surface of the tester. The tester has 100 graduations. The the load acting on the spring when the pointer of the tester is at zeroth graduation is 2.24 gf while the spring load when the pointer is at 100th graduation is 33.85 gf. In measuring the micro rubber hardness of the charging roll, the charging roll is supported by V-blocks at its axially opposite ends such that the roll extends in the horizontal direction. The cylindrical measuring head is brought into a pressed contact with the circumferential surface of the roll at its axially middle portion. Then, 33.85 g load is applied to the tester in the vertical direction. The reading of the tester represents the micro rubber hardness upon application of the load.

In a first preferred form of the present invention, the conductive base layer is a conductive rubber foamed body. According to this arrangement, the hardness of the conductive base layer is advantageously lowered, so that the the overall hardness of the charging roll, in other words, the Asker C hardness as measured upon application of 1 kg load thereto, is easily controlled to not more than 48 degrees.

In a second preferred form of the present invention, the outer structure consists of a resistance adjusting layer which is made of a non-foamable semi-conductive rubber material. In this case, the resistance adjusting layer is formed of a material having a relatively high hardness, so that the surface hardness of the charging roll, in other words, the micro rubber hardness of the roll as measured upon application of 33.85 g load thereto, is easily controlled to a relatively high value in the range of 65–85 degrees.

In a third preferred form of the present invention, the hardness increasing agent is contained in the resistance adjusting layer for increasing its hardness. According to this arrangement, the hardness of the resistance adjusting layer is increased to accordingly increase the hardness of the roll surface, so that the micro rubber hardness is controlled to within the specified range as described above.

In a fourth preferred form of the present invention, the outer structure consists of: a resistance adjusting layer formed on the outer circumferential surface of the conductive base layer and made of a non-foamable semi-conductive rubber material, and a protective layer formed on an outer circumferential surface of the resistance adjusting layer and made of a soft resin material.

In a fifth preferred form of the present invention, the outer structure consists of: a non-foamable conductive elastic layer formed on the outer circumferential surface of the conductive base layer and made of a thermoplastic elastomer material, a resistance adjusting layer formed on an outer circumferential surface of the conductive elastic layer and made of a non-foamable semi-conductive rubber material, and a protective layer formed on an outer circumferential surface of the resistance adjusting layer and made of a soft resin material.

BRIEF DESCRIPTION OF THE DRAWINGS

The above and optional objects, features, advantages and technical and industrial significance of the present invention will be better understood by reading the following description of the presently preferred embodiments of the invention, in connection with the accompanying drawings, in which.

DETAILED DESCRIPTION ON PREFERRED EMBODIMENTS

Figure 1:
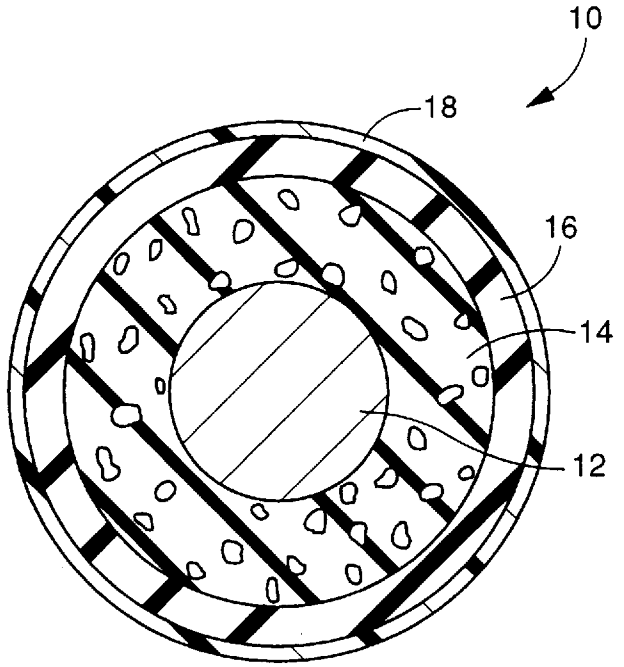
FIG. 1 is a transverse cross-sectional view showing one embodiment of a charging roll of the present invention.

Referring first to FIG. 1, there is shown a charging roll 10 constructed according to a first embodiment of the present invention. In the figure, the charging roll 10 is shown in transverse cross section. The charging roll 10 includes a center shaft 12 made of a metal. On the outer circumferential surface of the center shaft 12, there are integrally formed an electrically conductive base layer 14, a resistance adjusting layer 16 and a protective layer 18 in the order of description. These layers 14, 16, 18 are laminated on each other in the radially outward direction of the roll 10. In other words, the charging roll 10 has a two-layered outer structure consisting of the resistance adjusting and protective layers 16, 18, which surface structure is provided on the outer circumferential surface of the conductive base layer 14 formed around the shaft 12.

The conductive base layer 14 is a foamed body of a conductive rubber material. The conductive rubber foamed body is formed of a foamable conductive rubber composition which consists principally of a rubber foamable material and an electron-conductive material. Described more specifically, the rubber foamable material may be selected from known rubber foamable materials which do not suffer from fatigue or other problems and which control the hardness of the obtained conductive base layer 14 to a desired low level. For example, the rubber foamable material is obtained by mixing a rubber material with an organic foaming agent such as dinitroso pentamethylene tetramine, azodicarbonamide, p-toluenesulfonyl hydrazine, azobisisobutyronitrile or 4,4'-oxybisbenzene-sulfonyl hydrazine, or an inorganic foaming agent such as sodium bycarbonate. The rubber material to be mixed with the foaming agent may consist solely of natural rubber, or a synthetic rubber selected from ethylene-propylene-diene rubber (EPDM), ethylene-propylene rubber, styrene-butadiene rubber, nitrile-butadiene rubber, butadiene rubber, chloroprene rubber, acrylate rubber and polynorbornene rubber, or may be a mixture of two or more of the above-indicated rubbers. To the thus prepared rubber foamable material, there is added, as a conductive filler, a suitable amount of an electron-conductive material such as carbon black, graphite, metal powder, conductive metal oxide (e.g., stannic oxide, titanium oxide or zinc oxide), so that the foamable conductive rubber composition provides the conductive base layer 14 which has a volume resistivity of not more than $10^6$ Ωcm and hardness of not more than 20 degrees. The hardness is represented by Asker C hardness as measured upon application of 1 kg load to the conductive base layer 14.

The conductive base layer 14 prepared from the above-described foamable conductive rubber composition has a sponge structure which exhibits electrical conductivity, so that the charging roll 10 has desired electrical conductivity while assuring low hardness or high flexibility without using a large amount of softener. Accordingly, the present charging roll 10 does not suffer from conventionally experienced oozing or bleeding of the softener onto the roll surface, thereby avoiding contamination of the image bearing medium which is held in contact with the charging roll. The conductive rubber foam material for the conductive base layer 14 may further contain as needed suitable amounts of various known compounding agents or additives such as a vulcanizing agent, vulcanizing aid, filler and processing aid.

The resistance adjusting layer 16 which is an inner layer of the two-layer surface structure of the charging roll 10 is formed of a non-foamable semi-conductive rubber material conventionally used for forming the resistance adjusting layer. For instance, the non-foamable semi-conductive rubber material is obtained by mixing a rubber material such as nitrile-butadiene rubber, acrylate rubber, epichlorohydrine rubber, epichlorohydrin-ethylene oxide copolymer rubber, with a conductive agent, preferably an ion-conductive material, and an antistatic agent. The thus prepared non-foamable semi-conductive rubber material provides the resistance adjusting layer 16 which has a volume resistivity in a range of $10^7$–$10^{10}$ Ωcm. The non-foamable semi-conductive rubber material may further contain as needed suitable amounts of various known compounding agents and additives. Examples of the ion-conductive material contained in the semi-conductive rubber material are quaternary ammonium salt such as trimethyloctadecyl ammonium perchlorate or benzyltrimethyl ammonium chloride, and perchlorate such as lithium perchlorate or potassium perchlorate. The antistatic agent contained in the semi-conductive rubber material may be suitably selected, for instance, from along tetraalkylammonium salt, phosphate, sulfate salt of aliphatic alcohol, polyhydric aliphatic alcohol and BN complex.

Owing to the presence of the resistance adjusting layer 16 prepared from the above-described non-foamable semi-conductive rubber material, the electric resistance of the obtained charging roll 10 is controlled to within an appropriate range, so as to improve the withstand voltage of the roll (resistance to leakage of the electric current). The non-foamable semi-conductive rubber material for the resistance adjusting layer 16 is formed, by extrusion, into a tube with a suitable thickness. Alternatively, the material is dissolved in a suitable solvent so as to provide a coating liquid. The resistance adjusting layer 16 is formed according to a known molding method using the tube. Alternatively, the resistance adjusting layer 16 is formed according to a known coating method using the coating liquid.

The resistance adjusting layer 16 formed as described above according to the present invention has hardness which is higher than that of a resistance adjusting layer of a conventional charging roll, to accordingly increase the overall hardness of the surface structure consisting of the the resistance adjusting layer 16 and the protective layer 18. Accordingly, the hardness of the surface of the charging roll 10 is increased as desired. The hardness of the resistance adjusting layer 16 is increased, for example, (1) by mixing a hardness increasing agent with the material for the resistance adjusting layer 16, (2) by selecting, as a main component of the material for the resistance adjusting layer 16, a rubber material having a relatively high hardness from among the above-indicated rubber materials, or (3) by increasing the thickness of the resistance adjusting layer 16. Only one of these three methods or any combination of the methods may be employed for increasing the hardness of the resistance adjusting layer 16.

As the hardness increasing agent used to increase the hardness of the resistance adjusting layer 16 according to the above method (1), any known materials may be employed as long as the hardness of the charging roll 10 falls within an appropriate range which will be described in detail. It is generally preferable to use, as the hardness increasing agent, a solid material such as silica in granular or powder form. The content of the hardness increasing agent to be contained in the material for the resistance adjusting layer 16 is not particularly limited, but may be suitably determined to increase the hardness of the charging roll 10 as desired. In general, the hardness increasing agent is contained in the material for the resistance adjusting layer 16 in an amount of 10–50 parts by weight per 100 parts by weight of the rubber material as the main component of the material.

When the hardness of the resistance adjusting layer 16 is increased according to the above method (2), a suitable rubber material is selected from among the above-indicated rubber materials, as long as the rubber material permits the hardness of the surface of the roll to increase to a desired level. For instance, nitrile-butadiene rubber or hydrogenated nitrile-butadiene rubber is suitably employed.

If the thickness of the resistance adjusting layer 16 is increased to raise its hardness according to the above method (3), the thickness is determined such that the hardness of the roll surface falls within a desired range. For instance, the thickness of the layer 16 is generally in the range of 100–800 μm.

The protective layer 18 as an outer layer of the two-layered outer structure of the roll 10 is formed of a soft resin material. The soft resin material may be selected from known materials conventionally used for forming the protective layer 18. For instance, a thermoplastic resin material is suitably used, such as N-methoxymethylated nylon, butyral resin, urethane resin, copolymer of 4-ethylene fluoride and vinylidene fluoride or copolymer of 4-ethylene fluoride and vinylidene fluoride and hexafluoropropylene. To the thermoplastic resin material, the conductive material such as the above-described electron-conductive material is added, so that resin composition provides the protective layer 18 having a volume resistivity in a range of $10^7$–$10^{10}$ Ωcm. The thus prepared resin composition for the protective layer 18 may further contain as needed suitable amounts of a known cross linking agent such as that contains isocyanate, compounding agents and additives. The protective layer 18 prepared from the above resin composition effectively prevents the compounding agents or the like from oozing or coming out from the inner layers of the roll 10 onto the roll surface while lowering the tackiness of the roll surface, whereby the charging roll 10 does not suffer from the problems such as contamination of the image bearing medium or sticking of the roll to the image bearing medium.

Usually, the resin composition for forming the protective layer 18 is dissolved in an appropriate solvent so as to provide a coating liquid. The protective layer 18 is formed by coating operation using the prepared coating liquid. The protective layer 18 may be eliminated, in other words, the outer structure of the roll may consist solely of the resistance adjusting layer 16 in a case where the conductive base layer 14 and the resistance adjusting layer 16 are formed of the respective materials which are prepared so as to effectively prevent the contamination of the image bearing medium and the sticking of the roll to the image bearing medium.

In the charging roll 10 constructed according to the present invention, the conductive base layer 14 has the sponge structure, so that the roll 10 exhibits low hardness or high flexibility as described above. More specifically explained, in the charging roll 10 of the present invention, Asker C hardness representative of the overall hardness of the charging roll is controlled to not more than 48 degrees as measured upon application of 1 kg load thereto. If the Asker C hardness as measured upon application of 1 kg load exceeds 48 degrees, the overall hardness of the charging roll 10 is undesirably increased, resulting in insufficient effect of reducing the charging noise in a low-frequency range of the AC voltage applied to the charging roll 10 for charging the image bearing medium in contact with the roll 10. The lower limit of the Asker C hardness of the charging roll 10 as measured upon application of 1 kg load thereto is determined to be as low as possible provided that the durability or charging performance of the charging roll 10 is not adversely influenced in its practical use.

In the present charging roll 10, the hardness of the resistance adjusting layer 16 is increased to accordingly increase the hardness of the outer structure of the charging roll 10. Thus, the hardness of the roll surface is increased as desired. The hardness of the roll surface, i.e., so-called "micro rubber hardness" needs to be controlled to within a range of 65–85 degrees as measured upon application of 33.85 g load to the roll. If the micro rubber hardness measured upon application of 33.85 g load is lower than 65°, the roll surface tends to be soft, whereby the area of contact between the charging roll 10 and the image bearing medium is increased. In this case, the charging noise is not sufficiently reduced in a high-frequency range of the AC voltage applied to the charging roll 10 for charging the image bearing medium, as in a case where the overall hardness is merely lowered. On the other hand, if the above-indicated micro rubber hardness exceeds 85 degrees, the roll surface tends to be hard, whereby the desired effect of reducing the charging noise is not obtained in a low-frequency range of the AC voltage applied to the charging roll, as in a case where the overall hardness of the roll is increased.

The charging roll 10 of the present embodiment may be produced according to a known manner. In general, two different methods are selectively employed depending on whether the material for the resistance adjusting layer 16 is in the form of the tube with a suitable thickness obtained by extrusion, or in the form of the coating liquid prepared as described above.

Described in detail, when the resistance adjusting layer 16 is formed by using the tube, the charging roll 10 is produced in the following manner. Initially, according to a known method such as molding, the conductive base layer 14 is formed around the center shaft 12 by foaming while the above-described tube is integrally laminated on the outer circumferential surface of the thus formed base layer 14, so as to provide the resistance adjusting layer 16. On the outer circumferential surface of the layer 16, the protective layer 18 having a suitable thickness is formed by a known coating method such as dipping, whereby a desired charging roll 10 is obtained.

On the other hand, when the resistance adjusting layer 16 is formed by using the coating liquid prepared as described above, the charging roll 10 is produced in the following manner. Initially, the conductive base layer 14 is formed around the center shaft 12 by foaming according to a known method such as molding. On the outer circumferential surface of the thus formed base layer 14, the resistance adjusting layer 16 and protective layer 18 are formed in this order according to a known coating method such as dipping, whereby a desired charging roll 10 is obtained.

The thickness of each layer of the charging roll 10 is suitably determined depending upon its applications. In particular, the thickness of the resistance adjusting layer 16 is determined in view of the intended hardness of the roll surface. In general, the thickness values of each of the conductive base layer 14, resistance adjusting layer 16 and protective layer 18 are about 2–5 mm, 100–800 μm and 1–20 μm, respectively.

Figure 2:
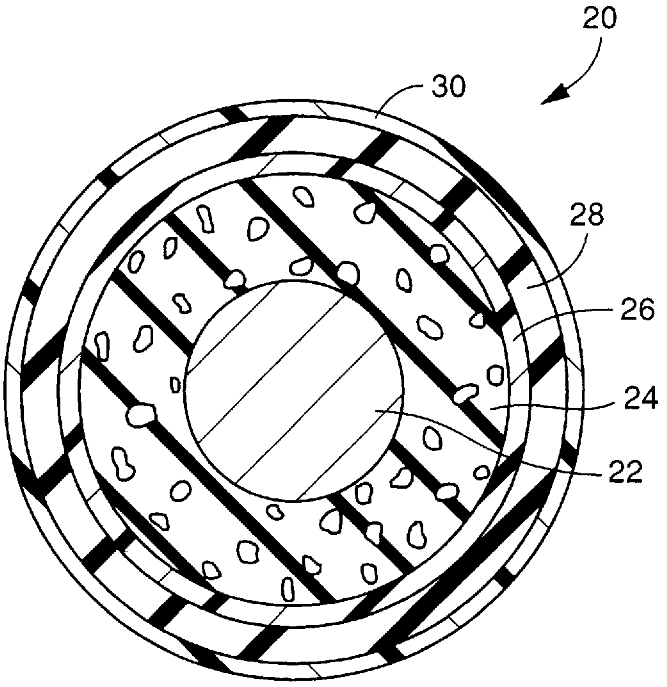
FIG. 2 is a transverse cross-sectional view showing another embodiment of a charging roll of the invention.

Referring next to FIG. 2, there is shown another example of the charging roll constructed according to a second embodiment of the present invention. The charging roll generally indicated at 20 of this second embodiment includes a center shaft 22 made of metal. On the outer circumferential surface of this center shaft 22, there are integrally formed an electrically conductive base layer 24, an electrically conductive elastic layer 26, a resistance adjusting layer 28 and a protective layer 30 in the order of description. These layers 24, 26, 28, 30 having respective thickness are laminated on each other in the radially outward direction of the roll 20. In other words, the charging roll 20 of the second embodiment has a three-layered outer structure consisting of the conductive elastic layer 26, resistance adjusting layer 28 and protective layer 30, which surface structure is provided on the outer circumferential surface of the conductive base layer 24 formed around the shaft 22.

Described in detail, the conductive base layer 24 of the charging roll 20 is formed of a material similar to that of the conductive base layer 14 of the charging roll 10 in the first embodiment. Accordingly, like the conductive base layer 14 in the first embodiment, the conductive base layer 24 in this second embodiment has a sponge structure which exhibits electrical conductivity, so that the charging roll 20 has desired electrical conductivity while assuring low hardness or high flexibility without using a large amount of softener. Accordingly, the charging roll 20 does not suffer from conventionally experienced oozing or bleeding of the softener onto the roll surface, thereby avoiding contamination of the image bearing medium which is held in contact with the charging roll.

The conductive elastic layer 26 as an innermost layer of the three-layered outer structure of the roll 20 is formed of a thermoplastic elastomer. Any known thermoplastic elastomers such as a polyester-type thermoplastic elastomer may be used for forming the conductive elastic layer 26. The conductive material such as the electron-conductive material as described above is added to the suitably selected thermoplastic elastomer, so as to provide the conductive elastic layer 26 having a volume resistivity in a range of $10^2$–$10^6$ Ωcm. Owing to the provision of the conductive elastic layer 26 formed of the thus prepared material, the overall hardness of the outer structure, in other words, the surface hardness of the charging roll 20, can be increased as desired without increasing the hardness of the resistance adjusting layer 28.

In other words, unlike the charging roll 10 of the first embodiment, the surface hardness of the charging roll 20 is suitably increased without using a large amount of the hardness increasing agent in the material for the resistance adjusting layer 28, selecting, as a main component of the material for the layer 28, the rubber having a relatively high hardness, or increasing the thickness of the resistance adjusting layer 28.

The material for the conductive elastic layer 26 may further contain suitable amounts of various known compounding agents and additives as needed. The prepared material for the conductive elastic layer 26 is formed by extrusion into a tube with a suitable thickness, or dissolved in a suitable solvent to provide a coating liquid. The conductive elastic layer 26 is formed according to a known method such as molding by using the tube. Alternatively, the conductive elastic layer 26 is formed according to a known coating operation by using the coating liquid.

The resistance adjusting layer 28 and the protective layer 30 which respectively constitute an intermediate layer and and an outermost layer of the outer structure of the roll 20 are formed of similar materials respectively used for forming the resistance adjusting layer 16 and the protective layer 18 of the charging roll 10. Like the charging roll 10 of the first embodiment, the charging roll 20 of the present embodiment has suitably controlled electrical conductivity and exhibits enhanced withstand voltage (the resistance to the electric current). Moreover, the charging roll 20 does not suffer from the conventionally experienced problems such as contamination of the image bearing medium and sticking of the roll to the image bearing medium.

Owing to the presence of the conductive base layer 24 having a sponge structure, the charging roll 20 has Asker C hardness not more than 48 degrees as measured upon application of 1 kg load thereto. Thus, the overall hardness of the charging roll 20 is controlled to a relatively low level. The micro rubber hardness of the roll 20 is controlled to be relatively high, i.e., in a range of 65–85 degrees as measured upon application of 33.85 g load to the roll. Accordingly, the charging roll 20 also exhibits excellent characteristics as described above with respect to the charging roll 10.

In producing the charging roll 20, two different methods are selectively employed depending upon whether the material for the conductive elastic layer 26 is in the form of the tube obtained by extrusion, or in the form of the coating liquid prepared as described above.

Described in detail, when the conductive elastic layer 26 is formed by using the tube, the charging roll 20 is produced in the following manner. Initially, according to a known method such as molding, the conductive base layer 24 is formed around the center shaft 22 by foaming while the above-described tube is integrally laminated on the outer circumferential surface of the base layer 24, so as to provide the conductive elastic layer 26. On the outer circumferential surface of the thus formed conductive elastic layer 26, the resistance adjusting layer 28 and protective layer 30 having respective thickness values are formed in this order according to a known coating method such as dipping, whereby a desired charging roll 20 is obtained.

On the other hand, when the conductive elastic layer 26 is formed by using the coating liquid prepared as described above, the charging roll 20 is produced in the following manner. Initially, the conductive base layer 24 is formed around the center shaft 22 by foaming according to a known method such as molding. On the outer circumferential surface of the thus formed base layer 24, the conductive elastic layer 26, resistance adjusting layer 28 and protective layer 30 having respective thickness values are formed in this order according to a known coating method such as dipping. Thus, a desired charging roll 20 is obtained.

The thickness of each of the layers of the charging roll 20 is suitably determined depending upon its applications. In general, the thickness values of the conductive base layer 24, conductive elastic layer 26, resistance adjusting layer 28 and protective layer 30 are about 2–5 mm, 5–10 $\mu$m, 100–250 $\mu$m, and 1–20 $\mu$m, respectively.

EXAMPLES

To further clarify the principle of the present invention, there will be described some examples of the charging roll constructed according to the present invention. However, it is to be understood that the invention is by no means limited to the details of these examples, but may be embodied with various changes, modifications and improvements which may occur to those skilled in the art, without departing from the scope of the invention.

Example 1

Initially, there were prepared materials for the conductive base layer, resistance adjusting layer and protective layer, respectively, so that the materials have respective compositions as indicated below. The material for the protective layer was dissolved in methyl alcohol so as to provide a coating liquid having a suitable viscosity value.

| | |
|---|---|
| <Composition for the conductive base layer> | |
| ethylene-propylene rubber | 100 parts by weight |
| carbon black | 25 parts by weight |
| zinc oxide | 5 parts by weight |
| stearic acid | 1 part by weight |
| process oil | 30 parts by weight |
| dinitrosopentamethylene tetramine (foaming agent) | 15 parts by weight |
| sulfur | 1 part by weight |
| dibenzothiazolyl disulfide (vulcanizing aid) | 2 parts by weight |
| tetramethylthiuram monosulfide (vulcanizing aid) | 1 part by weight |
| <Composition for the resistance adjusting layer> | |
| epichlorohydrin-ethylene oxide copolymer rubber | 100 parts by weight |
| fine powder of silica ("NIPSIL VN3" available from NIPPON SILICA CO., Ltd., Japan) | 10 parts by weight |
| trimethyloctadecyl ammonium perchlorate | 0.2 part by weight |
| stearic acid | 1 part by weight |
| clay ("DEXY CLAY" available from SHIRAISHI CALCIUM Co., Ltd., Japan) | 30 parts by weight |
| red lead | 5 parts by weight |
| ethylene thiourea | 1.5 parts by weight |
| <Composition for the protective layer> | |
| N-methoxymethylated nylon | 100 parts by weight |
| conductive stannic oxide ("SN-10" available from ISHIHARA SANGYO Co., Ltd., Japan) | 60 parts by weight |
| citric acid | 1 part by weight |

The materials for the conductive base layer and the resistance adjusting layer having the respective compositions as described above were concurrently passed through an extruder, so as to provide a two-layered laminar tube consisting of an inner layer that gives the conductive base layer and an outer layer that gives the resistance adjusting layer. Subsequently, an iron core member having an outside diameter of 6 mm and plated with nickel was inserted in an inner bore of the laminar tube after the surface of the core member was subjected to a bonding treatment by using a suitable conductive adhesive. The laminar tube with the core member inserted therein was then placed in position within a molding cavity of a cylindrical metal mold. Thereafter, the laminar tube was subjected to vulcanizing and foaming operations by heating, to thereby provide a rubber roll comprising a 3 mm-thick conductive base layer formed of the conductive rubber foam body and a 500 μm-thick resistance adjusting layer formed of the non-foamable semi-conductive rubber material, which layers are laminated in this order on the outer circumferential surface of the core member. After the rubber roll was taken out of the metal mold, it was subjected to a coating operation by dipping, using the coating liquid prepared for forming the protective layer, to thereby provide a 10 μm-thick protective layer on the outer circumferential surface of the obtained rubber roll. Thus, an intended charging roll according to Example 1 was obtained.

Example 2

A charging roll according to Example 2 was prepared as in Example 1, except that the material for the conductive base layer contains 26 parts by weight of carbon black. Namely, the resistance adjusting layer and the protective layer were formed of the materials respectively having the same compositions as in Example 1 indicated above. The thickness values of the respective layers were made same as those of the layers of the charging roll according to Example 1.

Example 3

A charging roll according to Example 3 was prepared as in Example 1, except that the material for the conductive base layer contains 28 parts by weight of carbon black. Namely, the resistance adjusting layer and the protective layer were formed of the materials respectively having the same compositions as in the above-indicated Example 1. The thickness values of the respective layers were made same as those of the layers of the charging roll of Example 1.

Example 4

A charging roll according to Example 4 was prepared as in Example 1, except that the material for the resistance adjusting layer further contains 30 parts by weight of fine powder of silica as the hardness increasing agent. Namely, the conductive base layer and the protective layer were formed of the materials respectively having the same compositions as in the above-indicated Example 1. The thickness values of the respective layers were made same as those of the layers of the charging roll of Example 1.

Example 5

A charging roll according to Example 5 was prepared as in Example 1, except that the material for the conductive base layer contains 28 parts by weight of carbon black and the material for the resistance adjusting layer contains 30 parts by weight of fine powder of silica. The protective layer was formed of the material having the same composition as in Example 1. The thickness values of the respective layers were made same as those of the layers of the charging roll of Example 1.

Example 6

A charging roll according to Example 6 was prepared as in Example 1, except that the material for the resistance adjusting layer contains 40 parts by weight of fine powder of silica. Namely, the conductive base layer and the protective layer were formed of the materials respectively having the same compositions as in the above-indicated Example 1. The thickness values of the respective layers were made same as those of the layers of the charging roll of Example 1.

Example 7

A charging roll according to Example 7 was prepared as in Example 1, except that the material for the conductive base layer contain 26 parts by weight of carbon black and the material for the resistance adjusting layer contains 40 parts by weight of fine powder of silica. The protective layer is formed of the material having the same composition as in the above-indicated Example 1. The thickness values of the respective layers were made same as those of the layers of the charging roll of Example 1.

Example 8

A charging roll according to Example 8 was prepared as in Example 1, except that the material for the conductive base layer contains 28 parts by weight of carbon black and the material for the resistance adjusting layer contains 40 parts by weight of fine powder of silica. The protective layer was formed of the material having the same composition as in the above-indicated Example 1. The thickness values of the respective layers were made same as those of the layers of the charging roll of Example 1.

Examples 9 and 10

Initially, there were prepared materials for the conductive base layer and for the protective layer respectively having the same compositions as in the above-indicated Example 1. A material for the resistance adjusting layer was prepared so as to have the same composition as in Example 1, except that the fine powder of silica is not contained therein. There was further prepared a material for the conductive elastic layer so as to have a composition indicated below. The materials for the resistance adjusting layer and for the protective layer were dissolved in methyl ethyl ketone and methyl alcohol, respectively, so as to provide coating liquids having respective viscosity values.

| <Composition for the conductive elastic layer> | |
|---|---|
| polyester-type thermoplastic elastomer | 100 parts by weight |
| carbon black | 30 parts by weight |

Next, two tubes were obtained by extruding the material for the conductive base layer, using a suitable extruder. Further, by extrusion of the material for the conductive elastic layer having the above-indicated composition, two tubes were obtained which had different thickness values and which had an inside diameter larger than an outside diameter of the tubes for the conductive base layer. The core member as used in Example 1 was inserted in each of the two tubes for the conductive base layer while the two tubes for the conductive elastic layer were respectively mounted on the two tubes for the conductive base layer. The thus prepared two laminar bodies ware placed in molding cavities of respective cylindrical metal molds. Subsequently, the laminar bodies were heated to be vulcanized and foamed so as to provide two rubber rolls. One of the obtained rubber rolls had a 3 mm-thick conductive base layer formed of the conductive rubber foam body, and a 200-μm thick conductive elastic layer formed of the thermoplastic elastomer, which layers were integrally laminated on the outer circumferential surface of the core member. The other rubber roll had a 3 mm-thick conductive base layer and a 400 μm-thick conductive elastic layer which were integrally laminated on the outer circumferential surface of the core member. After the two rubber rolls were taken out of the respective molds, they were subjected to a coating operation by dipping, using the coating liquids respectively prepared for forming the resistance adjusting layer and for forming the protective layer, so as to provide a 200 μm-thick resistance adjusting layer and a 10 μm-thick protective layer which were integrally laminated in this order on the outer circumferential surface of each of the rubber rolls. Thus, there were obtained two charging rolls, one of which had the 200 μm-thick conductive elastic layer (Example 9) and the other had the 400 μm-thick conductive elastic layer (Example 10).

Example 11

Initially, there was prepared a material for the conductive base layer so as to have the same composition as in the above-indicated Example 1. Further, there was prepared a material for the resistance adjusting layer having the composition indicated below.

| <Composition for the resistance adjusting layer> | |
|---|---|
| hydrogenated nitrile-butadiene rubber ("ZETPOL 2020" available from "NIPPON ZEON Co., Ltd., Japan) | 100 parts by weight |
| carbon black | 55 parts by weight |
| zinc oxide | 5 parts by weight |
| sulfur | 0.5 part by weight |
| zinc-di-n-butyl dithiocarbamate (vulacanizing aid) | 0.5 part by weight |
| cyclohexyl-benzothiazole sulfenamide (vulcanizing aid) | 1 part by weight |

As in the above-indicated Example 1, there was formed a rubber roll wherein a 3 mm-thick conductive base layer and a 500 μm-thick resistance adjusting layer were integrally formed in this order on the outer circumferential surface of the core member. This rubber roll was used as a charging roll according to Example 11.

Comparative Example 1

Initially, there were prepared materials for the conductive base layer and for the protective layer respectively having the same compositions as in the above-indicated Example 1. The resistance adjusting layer was formed of a material having the same composition as in Example 1, except that the fine powder of silica is not contained therein. The materials for the resistance adjusting layer and for the protective layer were dissolved in methyl ethyl ketone and methyl alcohol, respectively, to provide coating liquids having respective viscosity values.

Subsequently, a tube was obtained by extruding the material for the conductive base layer, using a suitable extruder. A core member as used in Example 1 was inserted in an inner bore of the tube. The tube was then placed in position within a molding cavity of a cylindrical metal mold, and was subjected to vulcanizing and foaming operations by heating. Thus, a rubber roll was obtained which had a 3 mm-thick conductive base layer formed on the outer circumferential surface of the core member. After the rubber roll was taken out of the mold, it was subjected to a coating operation by dipping, using the coating liquids respectively prepared for forming the resistance adjusting layer and for forming the protective layer, so as to provide a 200 μm-thick resistance adjusting layer and a 10 μm-thick protective layer which were integrally laminated in this order on the outer circumferential surface of the rubber roll. Thus, an intended rubber roll according to Comparative example 1 was obtained.

Comparative Example 2

A charging roll according to Comparative example 2 was prepared as in the above-indicated Comparative example 1, except that the material for the conductive base layer contains 26 parts by weight of carbon black. Namely, the resistance adjusting layer was formed of the same material as used for forming the resistance adjusting layer in Comparative example 1 (i.e., without containing fine powder of silica), and the protective layer was also formed of the same material as used for forming the protective layer in Comparative example 1. The thickness values of the respective layers were made same as those of the layers of the charging roll of Comparative example 1.

Comparative Example 3

A charging roll according to Comparative example 3 was prepared as in the above-indicated Comparative example 1, except that the material for the conductive base layer contains 28 parts by weight of carbon black. Namely, the resistance adjusting layer was formed of the same material as used for forming the resistance adjusting layer in Comparative example 1 (i.e., without containing fine powder of silica), and the protective layer was also formed of the same material as used for forming the protective layer in Comparative example 1. The thickness values of the respective layers were made same as those of the layers of the charging roll of Comparative example 1.

Comparative Example 4

A charging roll according to Comparative example 4 was prepared as in the above-indicated Comparative example 1, except that the material for the conductive base layer contains 31 parts by weight of carbon black. Namely, the resistance adjusting layer was formed of the same material as used for forming the resistance adjusting layer in Comparative example 1 (i.e., without containing fine powder of silica), and the protective layer was also formed of the same material as used for forming the protective layer in Comparative example 1. The thickness values of the respective layers were made same as those of the layers of the charging roll of Comparative example 1.

Comparative Example 5

A charging roll according to Comparative example 5 was prepared in the following manner. Initially, the same material as used for forming the conductive base layer in Comparative example 1 and the same material as used for forming the resistance adjusting layer in Comparative example 1 (i.e., without containing the fine powder of silica) were concurrently passed through an extruder, so as to provide a two-layered laminar tube consisting of an inner layer that gives the conductive base layer and an outer layer that gives the resistance adjusting layer. Subsequently, the core member as used in Example 1 was inserted in an inner bore of the laminar tube. The laminar tube with the core member inserted therein was then placed in position within a molding cavity of a cylindrical metal mold. Thereafter, the laminar tube was subjected to vulcanizing and foaming operations by heating, to thereby provide a rubber roll comprising a 3 mm-thick conductive base layer and a 500 μm-thick resistance adjusting layer which were laminated in this order on the outer circumferential surface of the core member. After the rubber roll was taken out of the metal mold, it was subjected to a coating operation by dipping, using the coating liquid prepared for forming the protective layer, to thereby provide a 10 μm-thick protective layer on the outer circumferential surface of the obtained rubber roll. Thus, an intended charging roll according to Comparative example 5 was obtained.

Comparative Example 6

A charging roll according to comparative example 6 was prepared as in the above-indicated Comparative example 5 by using the materials having the same compositions as in Comparative example, except that the material for the conductive base layer contains 26 parts by weight of carbon black. Namely, the resistance adjusting layer was formed of the same material as used for forming the resistance adjusting layer in Comparative example 1 (i.e., without containing fine powder of silica), and the protective layer was also formed of the same material as used for forming the protective layer in Comparative example 1. The thickness values of the respective layers were made same as those of the layers of the charging roll of Comparative example 5.

Comparative Example 7

A charging roll according to Comparative example 7 was prepared as in the above-indicated Comparative example 5 by using the materials having the same compositions as in Comparative example 1, except that the material for the resistance adjusting layer contains 40 parts by weight of fine powder of silica. Namely, the conductive base layer and the protective layer were formed of the respective same materials as used in Comparative example 1. The thickness values of the respective layers were made same as those of the layers of the charging roll of Comparative example 5.

Comparative Example 8

A charging roll according to comparative example 8 was prepared as in the above-indicated Comparative example 5 by using the materials having the same compositions as in Comparative example 1, except that the material for the conductive base layer contains 26 parts by weight of carbon black and the material for the resistance adjusting layer contains 40 parts by weight of fine powder of silica. The protective layer was formed of the same material as used for forming the protective layer in Comparative example 1. The thickness values of the respective layers were made same as those of the layers of the charging roll of Comparative example 5.

Comparative Example 9

A charging roll according to Comparative example 9 was prepared in the following manner. Initially, there were prepared a material for the resistance adjusting layer so as to have the same composition as used for forming the resistance adjusting layer in Comparative example 1 (i.e., without containing fine powder of silica), and a material for the protective layer so as to have the same composition as used for forming the protective layer in Comparative example 1. Further, there was prepared a material for the conductive base layer having the following composition. The charging roll of Comparative example 9 was obtained in the same manner as in the above-indicated Comparative example 1. The thickness values of the respective layers were made same as those of the charging roll of Comparative example 1.

| <Composition for the conductive base layer> | |
|---|---|
| isoprene rubber ("KURARAY IR-10" available from KURARAY Co., Ltd., Japan) | 40 parts by weight |
| liquid-type isoprene rubber ("KURARAY CIR-290, available from KURARAY Co., Ltd., Japan) | 60 parts by weight |
| carbon black | 13 parts by weight |
| zinc oxide | 5 parts by weight |
| stearic acid | 1 part by weight |
| sulfur | 0.5 part by weight |
| dibenzothiazole sulfide (vulcanizing aid) | 2 parts by weight |
| zinc-dimethyldithiocarbamate (vulcanizing aid) | 0.6 part by weight |

The thus obtained twenty charging rolls (according to Examples 1–11 and Comparative examples 1–9) were tested by measuring the Asker C hardness, the micro rubber hardness, and the charging noise, and also evaluating the image producing capability. The measurements and the evaluation were effected under the following conditions. The results of the measurements and evaluation are indicated in TABLES 1–4 below.

[Asker C hardness]

A spring-type hardness tester according to JIS-S-6050 (Japanese Industrial Standard) ("rubber.plastic hardness tester Asker C-type available from KOBUNSHI KEIKI CO., LTD., Japan) was used for measuring the Asker C hardness. Described in detail, each of the charting roll was supported by V-blocks at its axially opposite ends while the charging roll extended in the horizontal direction. The measuring head of the tester was brought into a pressed contact with the circumferential surface of the charging roll at its axially middle portion. In this state, only the weight of the tester acts on the roll through the measuring head. Then, a force is applied to the tester in the vertical direction, so that a total of 1 kg load acts on the roll. The reading of the tester represents the Asker C hardness upon application of the force.

[micro rubber hardness]

The micro rubber hardness of each of the charging rolls was measured by using a spring-type hardness tester ("micro rubber hardness tester.MD-1 available from KOBUNSHI KEIKI CO., LTD., Japan) using a cantilever plate spring. As in the measurement of the Asker C hardness, the measuring head of the tester was brought into a pressed contact with the circumferential surface of each of the charging rolls at its axially middle portion while the roll extended in the horizontal direction. Then, 33.85 g load was applied to the tester in the vertical direction. The reading of the tester represents the micro rubber hardness upon application of the load.

[charging noise]

Figure 3:
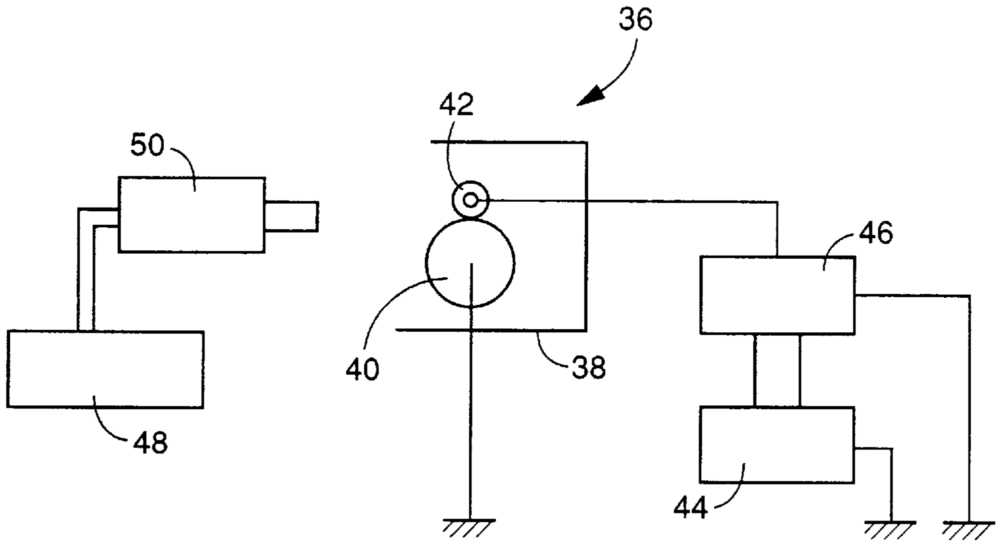
FIG. 3 is a view schematically showing a system for measuring a charging noise which is generated during operation of the image forming apparatus on which the charging roll of FIG. 1 is actually installed.
Figure 4:
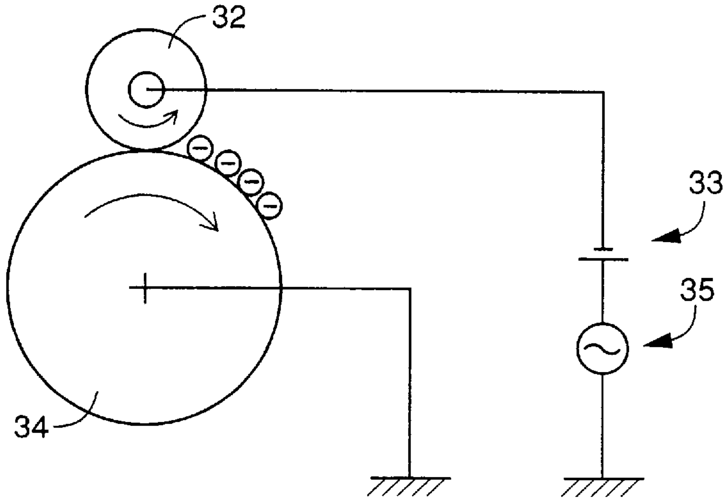
FIG. 4 PRIOR ART
FIG. 4 is a view schematically showing one example of a conventional charging method wherein a charging roll is held in contact with an image bearing medium for charging its surface.

As shown in FIG. 3, each of the charging rolls (42) was actually installed on a laser beam printer 36 ("LASER-JET 4 PLUS" manufactured by JAPAN HEWLETT PACKARD Co., Ltd., Japan) from which the developing portion accommodated in its cartridge 38 and the aluminum cylindrical member of the photosensitive drum 40 were removed. Each charging roll (42) was disposed in the cartridge 38 so as to be held in contact with the drum 40. A signal generator 44 ("NF1731" available from NF KAIROSEKKEI BLOCK Co., Ltd., Japan) was connected to a high-voltage amplifier 46 ("609C" available from LEC Co., Ltd., Japan) which was in turn connected, by a high-voltage cable, to electrode terminals of the cartridge 38 of the printer 36 while the amplifier 46 was grounded. Then, the photosensitive drum 40 was rotated at 30 rpm while a voltage of 2kVp-p-600V was applied to the charging roll 42 at different frequency values in a range of 200–2000 Hz, so that the drum 40 was charged. The charging noise generated upon the charging of the drum 40 was measured by a noise meter ("NL01A, available from RION Co., Ltd., Japan) which was connected to a linear coader 48 ("LR04" available from RION Co., Ltd., Japan). The noise meter was placed 100 mm away from the abutting surfaces of the roll 42 and the drum 40 in a direction perpendicular to the axis of the drum 40, such that the noise meter was placed in the same horizontal plane as the abutting surfaces. The noise level was evaluated in terms of A characteristic.

[image producing capability]

Each of the charging rolls was actually installed on a laser beam printer ("LASER-JET 4-PLUS" manufactured by JAPAN HEWLETT PACKARD Co., Ltd., Japan). Under the environment of 15° C. and 10% RH, a suitable image was printed on copy sheets so as to visually examine whether or not a reproduced or printed image suffered from lowered copy quality. In the following TABLES, "o" indicates that the reproduced image did not suffer from poor copy quality while "x" indicates the reproduced image suffered from poor copy quality.

TABLE 1

| | Examples | | | | | |
|---|---|---|---|---|---|---|
| | 1 | 2 | 3 | 4 | 5 | 6 |
| Asker C hardness (degrees) | 40 | 45 | 48 | 42 | 48 | 42 |
| micro rubber hardness (degrees) | 67 | 66 | 65 | 75 | 75 | 83 |
| Charging noise (dB) | | | | | | |
| 200 Hz | 49.0 | 49.0 | 50.0 | 49.5 | 49.5 | 48.0 |
| 400 Hz | 50.0 | 50.0 | 50.0 | 50.0 | 50.0 | 49.0 |
| 650 Hz | 50.5 | 50.5 | 51.0 | 50.0 | 50.5 | 50.0 |
| 1000 Hz | 54.0 | 54.5 | 54.5 | 53.5 | 53.5 | 53.0 |
| 1500 Hz | 50.0 | 50.5 | 50.5 | 50.0 | 50.0 | 49.0 |
| 2000 Hz | 52.0 | 52.0 | 53.0 | 51.5 | 52.0 | 49.0 |
| image producing capability | o | o | o | o | o | o |

TABLE 2

| | Examples | | | | |
|---|---|---|---|---|---|
| | 7 | 8 | 9 | 10 | 11 |
| Asker C hardness (degrees) | 45 | 48 | 45 | 48 | 42 |
| micro rubber hardness (degrees) | 84 | 85 | 77 | 83 | 74 |
| Charging noise (dB) | | | | | |
| 200 Hz | 49.0 | 50.5 | 50.5 | 51.0 | 50.0 |
| 400 Hz | 49.5 | 50.5 | 50.5 | 51.5 | 50.5 |
| 650 Hz | 50.0 | 50.5 | 50.5 | 51.5 | 50.5 |
| 1000 Hz | 53.0 | 54.0 | 54.0 | 55.0 | 54.0 |
| 1500 Hz | 49.5 | 50.0 | 51.0 | 50.0 | 49.5 |
| 2000 Hz | 50.0 | 51.0 | 51.0 | 52.0 | 51.5 |
| image producing capability | o | o | o | o | o |

TABLE 3

| | Comparative Examples | | | | |
|---|---|---|---|---|---|
| | 1 | 2 | 3 | 4 | 5 |
| Asker C hardness (degrees) | 42 | 45 | 48 | 55 | 42 |
| micro rubber hardness (degrees) | 43 | 43 | 45 | 49 | 60 |

TABLE 3-continued

| | Comparative Examples | | | | |
|---|---|---|---|---|---|
| | 1 | 2 | 3 | 4 | 5 |
| Charging noise (dB) | | | | | |
| 200 Hz | 51.0 | 52.0 | 55.0 | 57.0 | 50.0 |
| 400 Hz | 52.5 | 53.5 | 55.0 | 58.0 | 51.5 |
| 650 Hz | 56.3 | 57.0 | 57.0 | 57.0 | 55.3 |
| 1000 Hz | 60.5 | 61.0 | 62.0 | 62.0 | 59.3 |
| 1500 Hz | 61.3 | 58.0 | 57.0 | 58.0 | 60.3 |
| 2000 Hz | 67.0 | 64.0 | 62.0 | 61.0 | 62.0 |
| image producing capability | o | o | o | o | o |

TABLE 4

| | Comparative Examples | | | |
|---|---|---|---|---|
| | 6 | 7 | 8 | 9 |
| Asker C hardness (degrees) | 47 | 41 | 47 | 61 |
| micro rubber hardness (degrees) | 60 | 87 | 88 | 42 |
| Charging noise (dB) | | | | |
| 200 Hz | 54.0 | 47.5 | 55.0 | 59.0 |
| 400 Hz | 55.0 | 48.5 | 56.0 | 62.0 |
| 650 Hz | 58.5 | 50.5 | 58.0 | 65.0 |
| 1000 Hz | 63.0 | 57.0 | 63.0 | 68.0 |
| 1500 Hz | 57.0 | 56.0 | 58.0 | 65.0 |
| 2000 Hz | 62.0 | 54.0 | 60.0 | 70.0 |
| image producing capability | o | o | o | o |

As is apparent from the results as shown in the above TABLES 1–4, the charging rolls according to Examples 1–11 exhibited the Asker C hardness of not more than 48 degrees and the micro rubber hardness in the range of 65–85 degrees, both of which fall within the respective ranges as specified according to the present invention. On the other hand, in the charging rolls according to Comparative Examples 1–9, both of, or either one of, the Asker C hardness and the micro rubber hardness were outside the specified ranges of the present invention. The charging rolls of Examples 1–11 and the charging rolls of Comparative Examples 1–9 both exhibited good image producing capability. However, the sound pressure level of the charging noise generated by the charging rolls of Examples 1–11 was 55 dB or lower, irrespective of the changes in the frequency of the AC voltage applied thereto. On the other hand, the sound pressure level of the charging noise generated by the charging rolls of Comparative Examples 1–9 increased with an increase in the frequency of the AC voltage applied thereto. In the frequency range above 1000 Hz, the sound pressure level of the charging noise exceeded 55 dB. It will be understood from the results that the charging roll having the Asker C hardness and the micro rubber hardness both of which fall within the respective ranges as specified according to the present invention exhibits excellent image producing capability while, at the same time, permitting reduced charging noise, irrespective of the frequency range of the AC voltage applied to the charging roll.

What is claimed is:

1. A charging roll which is held in contact with an outer circumferential surface of an image bearing medium for charging said surface of said image bearing medium by application of a DC voltage and an AC voltage which is superimposed on said DC voltage, said charging roll comprising:

a center shaft;

an electrically conductive base layer formed on an outer circumferential surface of said shaft;

an outer structure formed on an outer circumferential surface of said conductive base layer; and said charging roll having Asker C hardness of less than 48 degrees as measured upon application of 1 kg load thereto and micro rubber hardness in a range of 65–85 degrees as measured upon application of 33.85 g load thereto.

2. A charging roll according to claim 1, wherein said conductive base layer has a thickness in a range of 2 $\mu$m–5 mm.

3. A charging roll according to claim 1, wherein said conductive base layer has a volume resistivity of not more than $10^6$ Ωcm.

4. A charging roll according to claim 1, wherein said conductive base layer is a conductive rubber foamed body.

5. A charging roll according to claim 1, wherein said conductive rubber foamed body is formed of a foamable conductive rubber composition comprising a rubber foamable material and an electron conductive material.

6. A charging roll according to claim 1, wherein said outer structure consists of a resistance adjusting layer which is made of a non-foamable semi-conductive rubber material.

7. A charging roll according to claim 6, wherein a hardness increasing agent is contained in said resistance adjusting layer for increasing its hardness.

8. A charging roll according to claim 6, wherein said resistance adjusting layer has a thickness in a range of 100 $\mu$m–800 $\mu$m.

9. A charging roll according to claim 6, wherein said resistance adjusting layer has a volume resistivity in a range of $10^7$ Ωcm–$10^{10}$ Ωcm.

10. A charging roll according to claim 1, wherein said outer structure consists of: a resistance adjusting layer formed on said outer circumferential surface of said conductive base layer and made of a non-foamable semi-conductive rubber material, and a protective layer formed on an outer circumferential surface of said resistance adjusting layer and made of a soft resin material.

11. A charging roll according to claim 10, wherein a hardness increasing agent is contained in said resistance adjusting layer for increasing its hardness.

12. A charging roll according to claim 10, wherein said resistance adjusting layer has a thickness in a range of 100 $\mu$m–800 $\mu$m.

13. A charging roll according to claim 10, wherein said resistance adjusting layer has a volume resistivity in a range of $10^7$ Ωcm–$10^{10}$ Ωcm.

14. A charging roll according to claim 10, wherein said protective layer has a thickness in a range of 1 $\mu$m–20 $\mu$m.

15. A charging roll according to claim 10, wherein said protective layer has a volume resistivity in a range of $10^7$ Ωcm–$10^{10}$ Ωcm.

16. A charging roll according to claim 1, wherein said outer structure consists of: a non-foamable conductive elastic layer formed on said outer circumferential surface of said conductive base layer and made of a thermoplastic elastomer material, a resistance adjusting layer formed on an outer circumferential surface of said conductive elastic layer and made of a non-foamable semi-conductive rubber material, and a protective layer formed on an outer circumferential surface of said resistance adjusting layer and made of a soft resin material.

17. A charging roll according to claim 16, wherein said conductive elastic layer has a thickness in a range of 5 $\mu$m–10 $\mu$m.

18. A charging roll according to claim 16, wherein said conductive elastic layer has a volume resistivity in a range of $10^2$ Ωcm–$10^6$ Ωcm.

19. A charging roll according to claim 16, wherein a hardness increasing agent is contained in said resistance adjusting layer for increasing its hardness.

20. A charging roll according to claim 16, wherein said resistance adjusting layer has a thickness in a range of 100 $\mu$m–250 $\mu$m.

21. A charging roll according to claim 16, wherein resistance adjusting layer has a volume resistivity in a range of $10^7$ Ωcm–$10^{10}$ Ωcm.

22. A charging roll according to claim 16, wherein said protective layer has a thickness in a range of 1 $\mu$m–20 $\mu$m.

23. A charging roll according to claim 16, wherein said protective layer has a volume resistivity in a range of $10^7$ Ωcm–$10^{10}$ Ωcm.

* * * * *